(12) United States Patent
Jiang

(10) Patent No.: US 7,632,471 B2
(45) Date of Patent: Dec. 15, 2009

(54) REACTION FURNACE UTILIZING HIGH-TEMP STEAM AND RECIRCULATED HEAT SOURCE TO SEPARATE MERCURY AND CRACK DIOXIN AND ORGANIC SUBSTANCES CONTAINED IN WASTE

(75) Inventor: Horng Jiang, 7F-2, No. 38, Daguan Rd., Xindian City (TW)

(73) Assignee: Horng Jiang, Xindian (TW)

( * ) Notice: Subject to any disclaimer, the term of this patent is extended or adjusted under 35 U.S.C. 154(b) by 455 days.

(21) Appl. No.: 11/727,803

(22) Filed: Mar. 28, 2007

(65) Prior Publication Data
US 2007/0231224 A1 Oct. 4, 2007

(30) Foreign Application Priority Data
Mar. 29, 2006 (TW) .............................. 95111017 A (51) Int. Cl.
*B01J 19/00* (2006.01)
*F28D 21/00* (2006.01)
*F23J 15/00* (2006.01)
*B09B 3/00* (2006.01)
*F23D 14/00* (2006.01)
*F23G 5/00* (2006.01)
*F23G 7/00* (2006.01)
*F23C 1/04* (2006.01)
*F23C 1/02* (2006.01)
*F23L 7/00* (2006.01)

(52) U.S. Cl. .................... 422/198; 422/204; 110/203; 110/235; 110/260; 110/306

(58) Field of Classification Search ................ 422/204, 422/198; 110/203, 235, 260, 306
See application file for complete search history.

(56) References Cited

U.S. PATENT DOCUMENTS 4,432,290 A * 2/1984 Ishii et al. .................... 110/346
4,878,440 A * 11/1989 Tratz et al. ................... 110/233

FOREIGN PATENT DOCUMENTS

TW 478979 A * 3/2002

OTHER PUBLICATIONS

English translation of TW 478979 A, which was published Mar. 2002.*

* cited by examiner

*Primary Examiner*—Walter D Griffin
*Assistant Examiner*—Natasha Young (57) ABSTRACT

A reaction furnace utilizing high-temp steam and recirculated heat source to separate mercury and crack dioxin and organic substances contained in waste includes a first combustion chamber having a burner for producing high-temp hot gas, which is sent to a second combustion chamber for heating a reaction chamber and a high-temp steam generator therein. High-temp steam produced by the high-temp steam generator is introduced into the reaction chamber for decomposing or distilling waste being treated. Gas mixture produced in the reaction chamber is discharged to a gas mixture treatment system for separation. Fuel gas and fuel oil separated from the gas mixture are introduced into the burner for producing the high-temp hot gas, and waste water separated form the gas mixture is led to the high-temp steam generator for producing the high-temp steam. And, soil in the waste that has been treated is discharged via a discharge outlet.

8 Claims, 7 Drawing Sheets

REACTION FURNACE UTILIZING HIGH-TEMP STEAM AND RECIRCULATED HEAT SOURCE TO SEPARATE MERCURY AND CRACK DIOXIN AND ORGANIC SUBSTANCES CONTAINED IN WASTE

FIELD OF THE INVENTION

The present invention relates to a reaction furnace providing a thermal cracking process; and more particularly, to a reaction furnace that utilizes high-temp hot gas produced in the process of treating waste as a recirculated heat source and uses high-temp steam produced in the process to separate mercury and crack dioxin and organic substances contained in waste.

BACKGROUND OF THE INVENTION

Most conventional cracking techniques involve batch-based cracking process. That is, a single furnace is vacuum heated to isolate the furnace from external air to conduct cracking process.

Taiwan Patent Publication No. 478979 discloses a non-pollution treatment method and apparatus for converting organic waste into usable resources. According to the above patent, an overall cracking reaction apparatus includes separated reaction furnace and heating furnace, and is characterized in that the reaction furnace is provided at a rear section with a primary coke treating tank, a secondary coke treating tank, and a coke cooling tank for treating coke produced in the cracking reaction process. The produced coke is discharged from the reaction furnace to the primary coke treating tank, in which the coke is stirred with a stirrer, so as to remove part of the residual volatile matters from the coke. The coke is further sent into the secondary coke treating tank, in which a first, a second, and a third stirring and conveying cylinder stir and convey the coke by turns. Meanwhile, the coke is heated while being stirred and conveyed to subject to a second time cracking reaction. All the reactions are conducted under a vacuum state in order to fully release all the volatile matters. After refinement, the coke is finally moved into the coke cooling tank to produce refined coke, which may be further processed to produce carbon black or other raw materials for preparing activated carbon.

However, the coke produced with the method and apparatus disclosed in Taiwan Patent Publication No. 478979 is not good in quality, and the apparatus is bulk in volume to increase the manufacturing cost thereof. The carbon black obtained from the above conventional cracking technique has organic substances remained therein to form a secondary waste. In addition, the produced oil contains a high sulfur ratio and a high amount of carbon impurities, and is therefore not suitable for reuse. Moreover, the cracking process taught by the above patent is a low-temp cracking process, which has low thermal efficiency and tends to cause dioxin pollution and other air pollution problems, and accordingly, requires improvements.

It is therefore tried by the inventor to develop a reaction furnace that utilizes high-temp steam and recirculated heat source to separate mercury and crack dioxin and organic substances contained in waste, so as to eliminate the drawbacks existed in the prior art.

SUMMARY OF THE INVENTION

A primary object of the present invention is to provide a furnace structure that utilizes high-temp steam produced by a high-temp steam generator and high-temp hot gas in a first combustion chamber to separate mercury, and decompose dioxin and any organic waste at the same time.

Another object of the present invention is to provide a furnace structure that utilizes a high-temp steam generator and a gas mixture treatment system to produce high-temp steam and treat waste gas, respectively, so that the furnace structure has the functions of heat exchange and waste gas treatment.

A further object of the present invention is to provide a furnace structure that utilizes high-temp steam produced by a high-temp steam generator and high-temp hot gas in a first combustion chamber to convert waste into fuel oil and fuel gas, which are then sent to a burner of the first combustion chamber for producing the high-temp hot gas, so that energy source is recirculated for use to achieve the purpose of energy saving and reducing operation cost of the furnace.

A still further object of the present invention is to provide a furnace structure that utilizes high-temp steam produced by a high-temp steam generator and high-temp hot gas in a first combustion chamber to treat waste, so as to produce activated carbon from the waste.

A still further object of the present invention is to provide a furnace structure that utilizes a gas mixture treatment system to separate water from gas mixture produced in the reaction process, and circulates the separated waste water for producing steam, so as to save energy and reduce the operation cost of the furnace.

To achieve the above and other objects, the reaction furnace of the present invention utilizes high-temp steam and recirculated high-temp hot gas as a heat source for thermal cracking process; utilizes the activity of high-temp steam to reduce the production of carbon dust, so as to increase the amount of fuel gas and the quality of fuel oil recovered from the waste; and utilizes the invasive power of steam to separate mercury from the waste based on the following principles:

$$C + H_2O \rightarrow CO + H_2$$

$$nC + mH_2 \rightarrow C_nH_m$$

$$S\text{---} + H_2 \rightarrow H_2S$$

$$Cl\text{---} + H_2 \rightarrow HCl$$

The reaction furnace of the present invention includes a first combustion chamber provided with a burner to produce high-temp hot gas; and a second combustion chamber provided with a gas inlet, a gas outlet, a reaction chamber, and a high-temperature steam generator. The reaction chamber is provided with a feed inlet, a gas mixture outlet, and a discharge outlet. And, more than one reaction chamber may be provided in the reaction furnace of the present invention.

Waste consisting of soil and carbon-containing substances, including carbon black, activated carbon, organic-containing materials, dioxin-containing substances, mercury-containing substances, plastic-containing substances, rubber-containing substances, coal, oil, kitchen residues, agricultural waste, and animal waste, is fed via the feed inlet into the reaction chamber. High-temp hot gas is either produced by the burner or directly introduced from an external heat source into the first combustion chamber and then sent into the second combustion chamber via the gas inlet, so as to heat the reaction chamber and the high-temp steam generator in the second combustion chamber. The high-temp hot gas is cooled down in the second combustion chamber and discharged via the gas outlet. Steam produced by the high-temp steam generator is introduced into the reaction chamber to decompose or distill the waste, so that mercury, organic substances, and dioxin in the waste are distilled and carried away by the steam. Gas mixture produced during the reaction process is discharged via a gas mixture outlet to a gas mixture treatment system for separation. Fuel gas and fuel oil separated from the gas mixture by the gas mixture treatment system are introduced into the burner of the first combustion chamber for producing the high-temp hot gas, and waste water separated from the gas mixture by the gas mixture treatment system is led to the high-temp steam generator for producing high-temp steam. And, soil contained in the treated waste is discharged via the discharge outlet.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
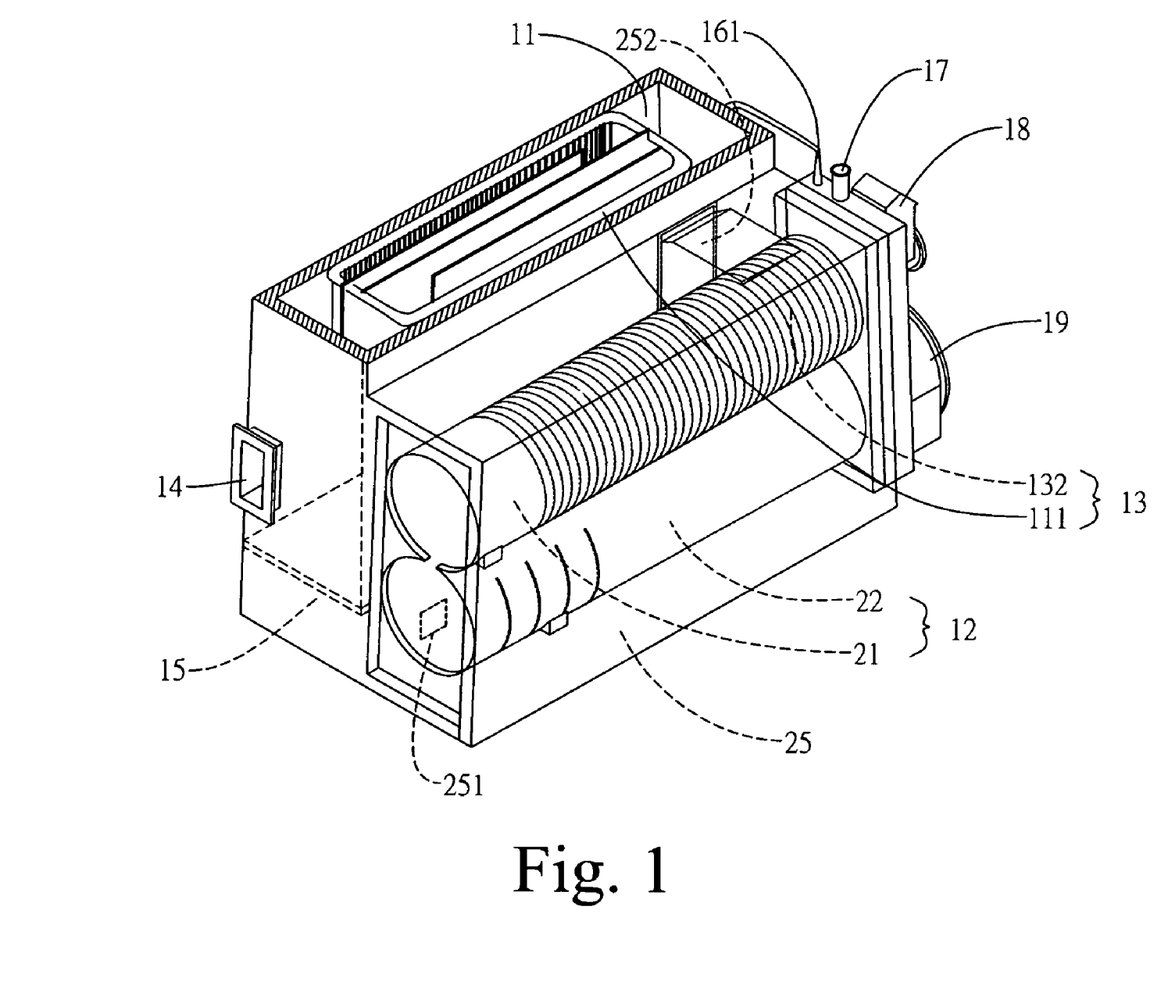
FIG. 1 is an assembled perspective view of a reaction furnace utilizing high-temp steam and recirculated heat source to separate mercury and crack dioxin and organic substances contained in waste according to a preferred embodiment of the present invention.
Figure 2:
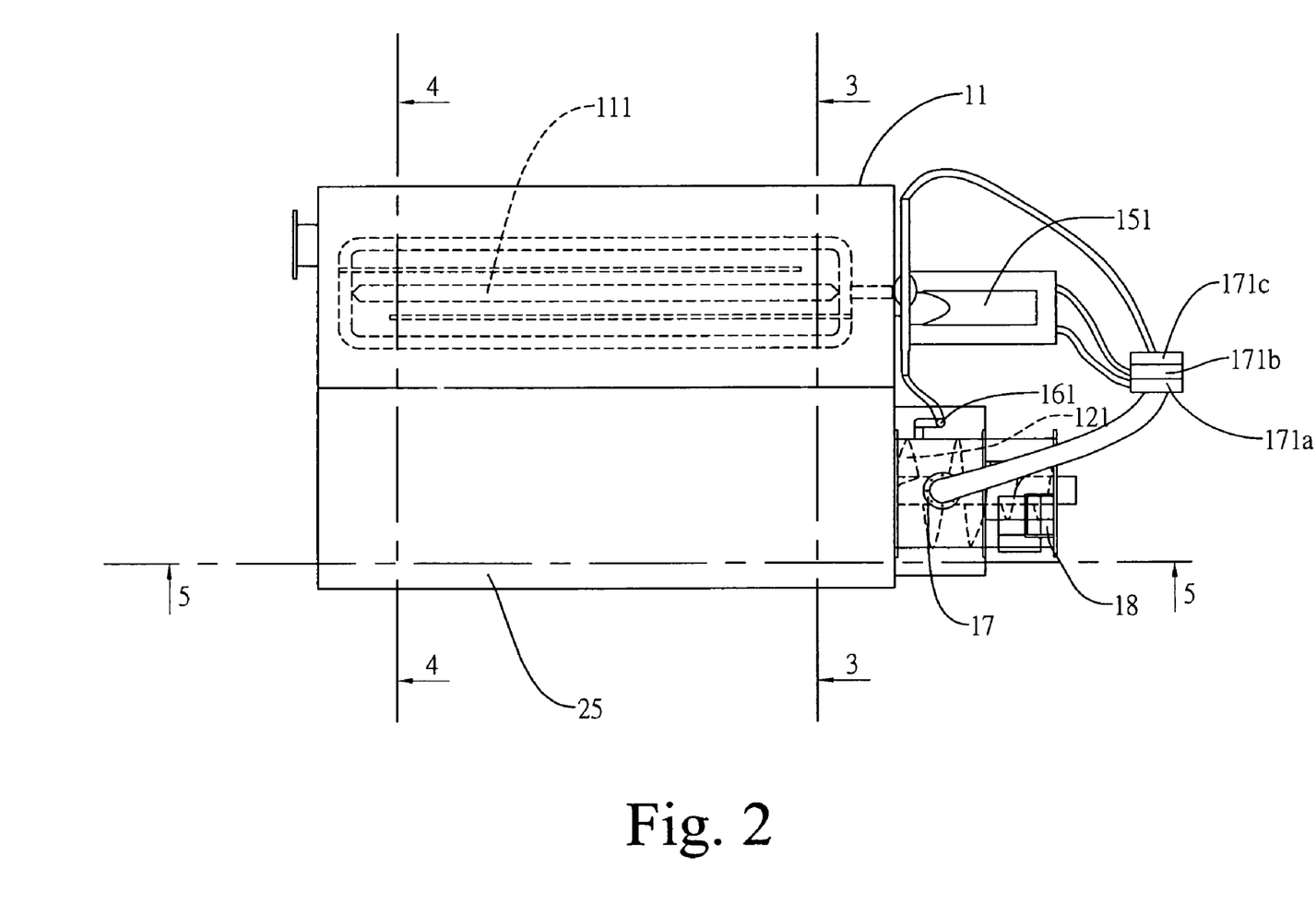
FIG. 2 is a top view of the reaction furnace of FIG. 1, with a gas mixture treatment system connected thereto.
Figure 3:
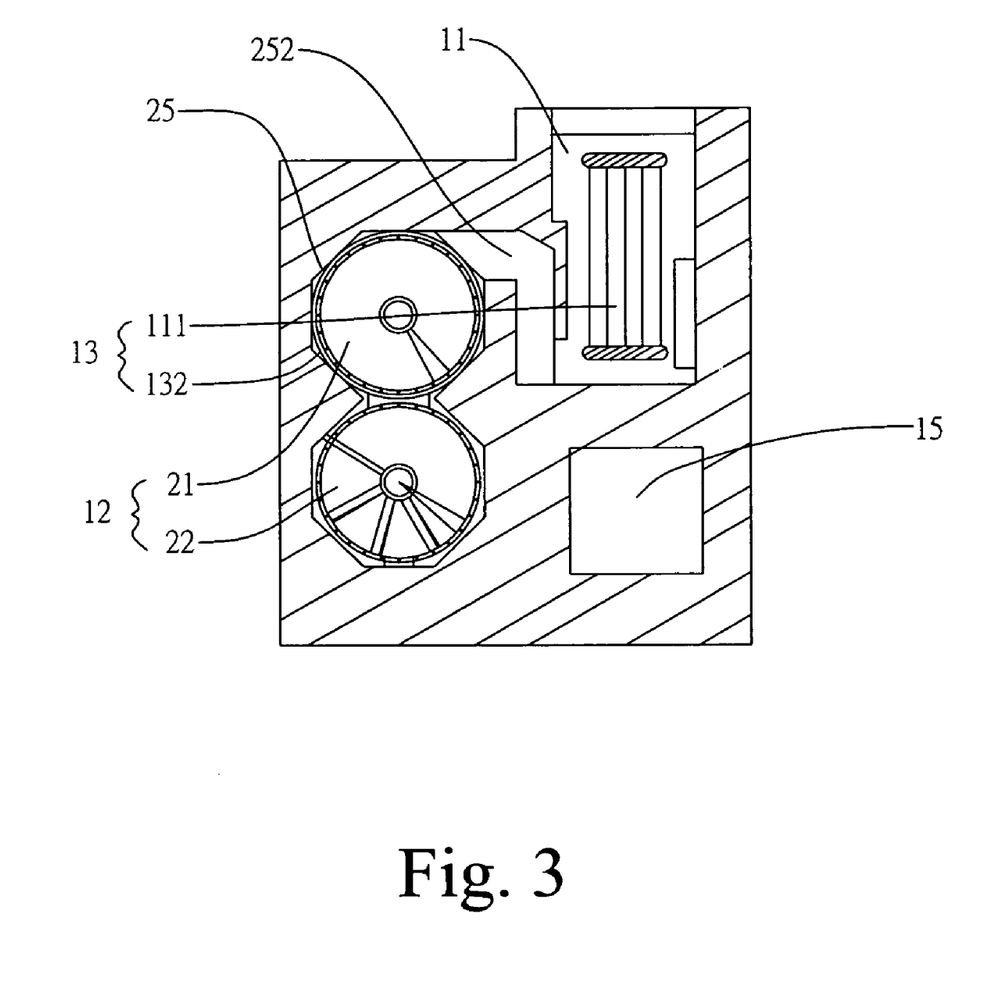
FIG. 3 is a sectional view taken along line 3-3 of FIG. 2.
Figure 4:
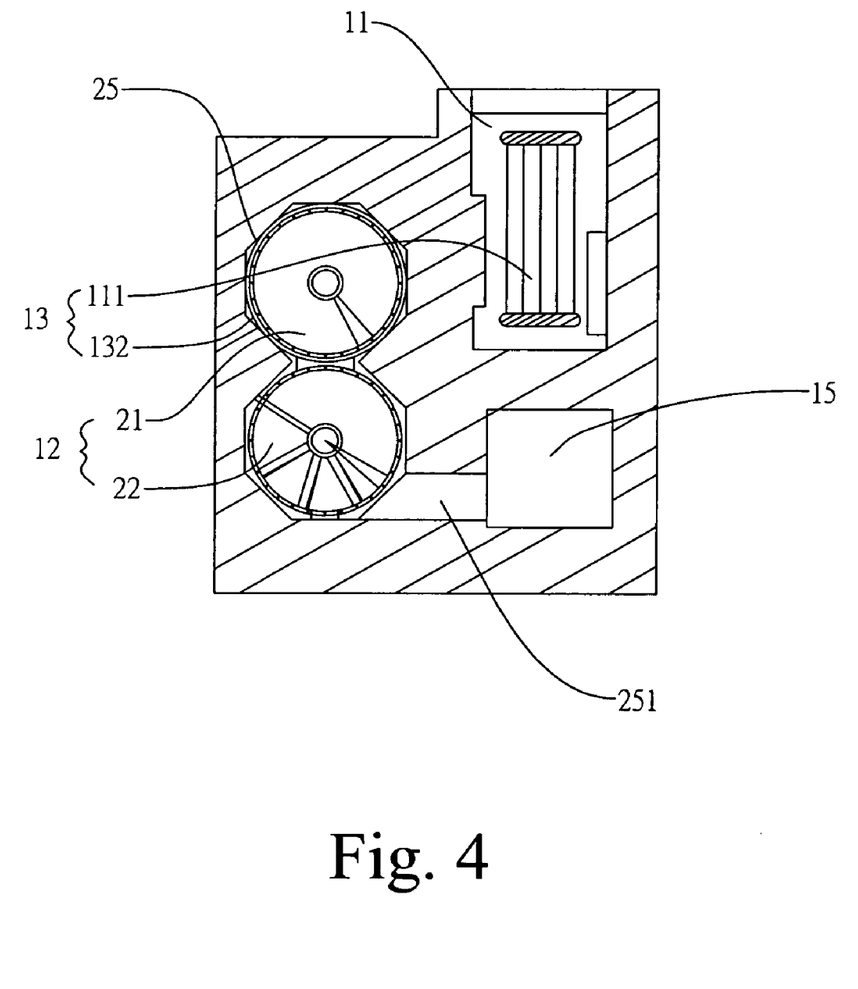
FIG. 4 is a sectional view taken along line 4-4 of FIG. 2.

Please refer to FIGS. 1 and 2 that are assembled perspective and top views, respectively, of a reaction furnace utilizing high-temp steam and recirculated heat source to separate mercury and crack dioxin and organic substances contained in waste according to a preferred embodiment of the present invention. As shown, the reaction furnace according to the preferred embodiment of the present invention includes a first combustion chamber 15 and a second combustion chamber 25. The first combustion chamber 15 is externally provided with a burner 151 for producing high-temp hot gas. Alternatively, the burner 151 is omitted, and high-temp hot gas more than 1000° C. is directly introduced from an external heat source (not shown) into the first combustion chamber 15.

Please also refer to FIGS. 3 through 6. The second combustion chamber 25 has a gas inlet 251, a gas outlet 252, a reaction chamber 12, and a high-temperature steam generator 13. The reaction chamber 12 includes a thermal cracking zone 21, in which a spiral feeding mechanism 121, a feed inlet 18, and a gas mixture outlet 17 are provided; and a high-temp activating zone 22, in which a discharge outlet 19 and a spiral feed mechanism 221 are provided.

Figure 5:
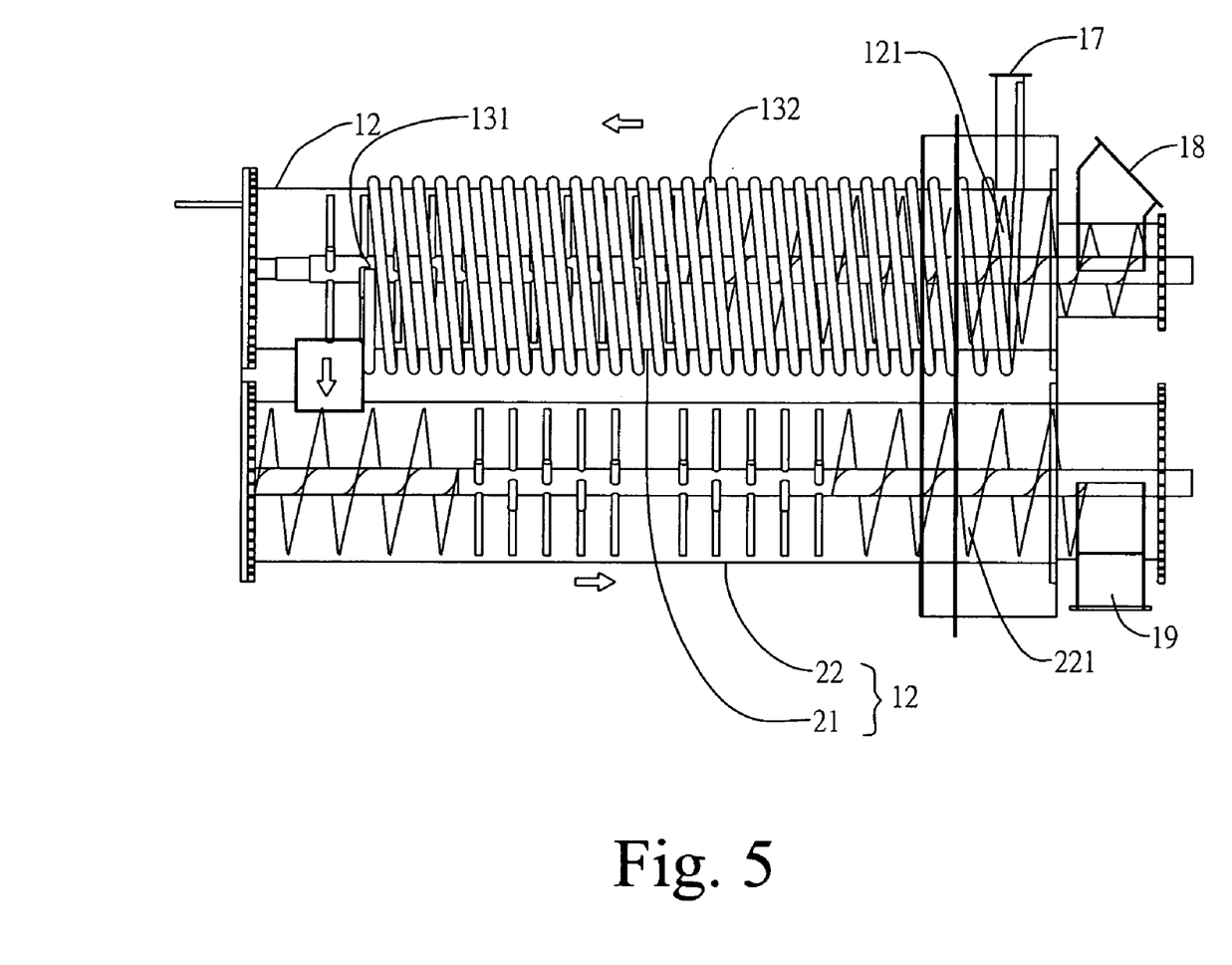
FIG. 5 is a sectional view taken along line 5-5 of FIG. 2.
Figure 6:
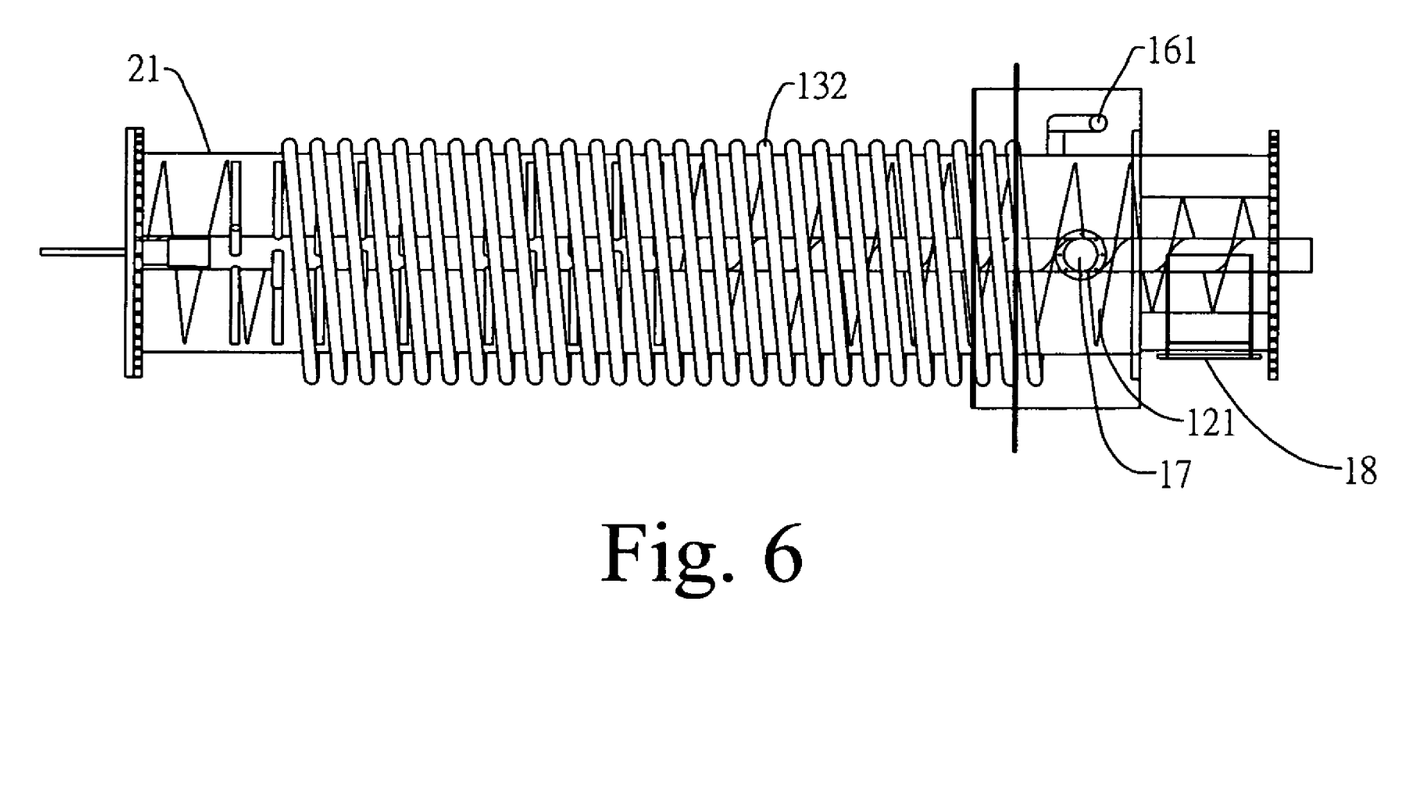
FIG. 6 is a top view of a thermal cracking reaction zone included in the reaction furnace of the present invention as shown in FIG. 1.

Please refer to FIGS. 1, 2, 5, and 6 at the same time. The high-temp steam generator 13 includes a high-temp steam heat exchanger 132 and a heat exchanger 111. The high-temp steam heat exchanger 132 is provided with a steam inlet 161 (see FIGS. 1, 2, and 6) and a high-temp steam inlet 131 (FIG. 5). The heat exchanger 111 is connected to and communicates with the steam inlet 161 of the high-temp steam heat exchanger 132, so that steam produced by the heat exchanger 111 flows through the steam inlet 161 into the high-temp steam heat exchanger 132 to be continuously heated to form high-temp steam. The heat exchanger 111 is located in a heat exchange chamber 11, which is provided with a discharge port 14 and communicates with the second combustion chamber 25 via the gas outlet 252, so that hot gas that has been cooled down in the second combustion chamber 25 is sent via the gas outlet 252 into the heat exchange chamber 11 to heat the heat exchanger 111. When the gas is cooled down for a second time, it is discharged via the discharge port 14.

Waste to be treated with the reaction furnace of the present invention consists of soil and carbon-containing substances, including carbon black, activated carbon, organic-containing materials, dioxin-containing substances, mercury-containing substances, plastic-containing substances, rubber-containing substances, coal, oil, kitchen residues, agricultural waste, and animal waste. The waste is fed via the feed inlet 18 into the thermal cracking reaction zone 21 for first-stage treatment. When it is desired to introduce high-temp hot gas into the second combustion chamber 25, either directly introduce high-temp hot gas of more than 1000° C. into the first combustion chamber 15 or use the burner 151 to heat a fuel gas to produce high-temp hot gas, and then send the high-temp hot gas from the first combustion chamber 15 into the second combustion chamber 25 via the gas inlet 251, so as to heat the thermal cracking reaction zone 21, the high-temp steam heat exchanger 132, and the high-temp activating zone 22 in the second combustion chamber 25. It is noted the high-temp hot gas sent into the second combustion chamber 25 must have a temperature higher than 1000° C. The hot gas is cooled down in the second combustion chamber 25 and sent via the gas outlet 252 to the heat exchange chamber 11 to heat the heat exchanger 111. When the hot gas is further cooled down in the heat exchange chamber 11, it is discharged via the discharge port 14. On the other hand, steam produced by the heat exchanger 111 has a temperature about 150° C., and is introduced via the steam inlet 161 into the high-temp steam heat exchanger 132 and be heated to higher than 350° C., depending on the type of waste being treated. The heat source for heating the steam is the high-temp hot gas from the first combustion chamber 15. When the high-temp hot gas passes through the heat exchange chamber 11, its temperature is suddenly lowered to less than 300° C. The temperature of the high-temp steam has relation with the substance to be cracked, and is adjustable and controllable. The high-temp steam is introduced via the high-temp steam inlet 131 into the thermal cracking reaction zone 21 to decompose the waste being treated therein. The waste primarily decomposed in the thermal cracking reaction zone 21 is then sent by the spiral feed mechanism 121 into the high-temp activating zone 22, so that the waste is completely decomposed, and activated carbon in the waste is activated. The soil having been treated in the high-temp activating zone 22 is discharged via the discharge outlet 19 by the spiral feed mechanism 221.

The high-temp hot gas from the first combustion chamber 15 must be higher than 1000° C. when it is sent into the second combustion chamber 25, so as to heat the thermal cracking reaction zone 21, the high-temp activating zone 22, and the high-temp steam heat exchanger 132. Wherein, the thermal cracking reaction zone 21 is heated to a temperature higher than 400° C., and the high-temp activating zone 22 to a temperature higher than 700° C.

The high-temp steam sent into the thermal cracking reaction zone 21 has a temperature that is determined according to the substance to be treated. For example, the steam must have a temperature higher than 300° C. in the cracking of plant, higher than 450° C. in the cracking of plastic and rubber waste, and higher than 400° C. in the separating of mercury. Moreover, the high-temp steam must be able to maintain a thermal balance with the waste being treated at a temperature higher than 350° C., so that mercury, organic substances, and dioxin in the waste being treated are distilled and decomposed to produce a gas mixture of CO, $H_2O$, $H_2$, CnHm, Hg, HCl, and $H_2S$. The produced gas mixture is discharged via the gas mixture outlet 17 and led to a gas mixture treatment system 171 for separation. The gas mixture treatment system 171 includes a cooler 171a, an oil/water separator 171b, and a mercury/water separator 171c. The gas mixture led to the gas mixture treatment system 171 is first processed at the cooler 171a to separate fuel gas and oil/mercury containing water from the gas mixture. The separated fuel gas is adsorbed by activated carbon to desorb residual mercury vapor from the gas, and then sent into the burner 151 for producing the above-mentioned high-temp hot gas. The separated oil/mercury containing water is sent to the oil/water separator 171b for oil/water separation, so that fuel oil is separated from the mercury-containing water and sent to the burner 151 for producing the above-mentioned high-temp hot gas. The separated mercury-containing water is further sent to the mercury/water separator 171c for mercury/water separation, so as to recover mercury from the water. And, the produced waste water is recirculated to enter into the heat exchanger 111 for producing the high-temp steam.

The high-temp steam would also react with free carbon dust to produce more CO and $H_2$, and to reduce the production of carbon dust.

The purpose of the first combustion chamber 15 is to produce a heat source higher than 1200° during a high-temp oxidation treatment therein. Therefore, the duration of high-temp oxidation at 1000° C. from the first combustion chamber 15 to the second combustion chamber 25 must be longer than two (2) seconds. The duration for the produced high-temp hot gas to flow from the second combustion chamber 25 to the discharge port 14 should not exceed 0.5 second with an outlet temperature not higher than 300° C., so as to avoid the dioxin in the high-temp hot gas from reduction. The high-temp activating zone 22 must have a temperature higher than 700° C. to completely desorb the mercury-containing substances and any organic substances from the waste and activate the carbon black to produce activated carbon.

Figure 7:
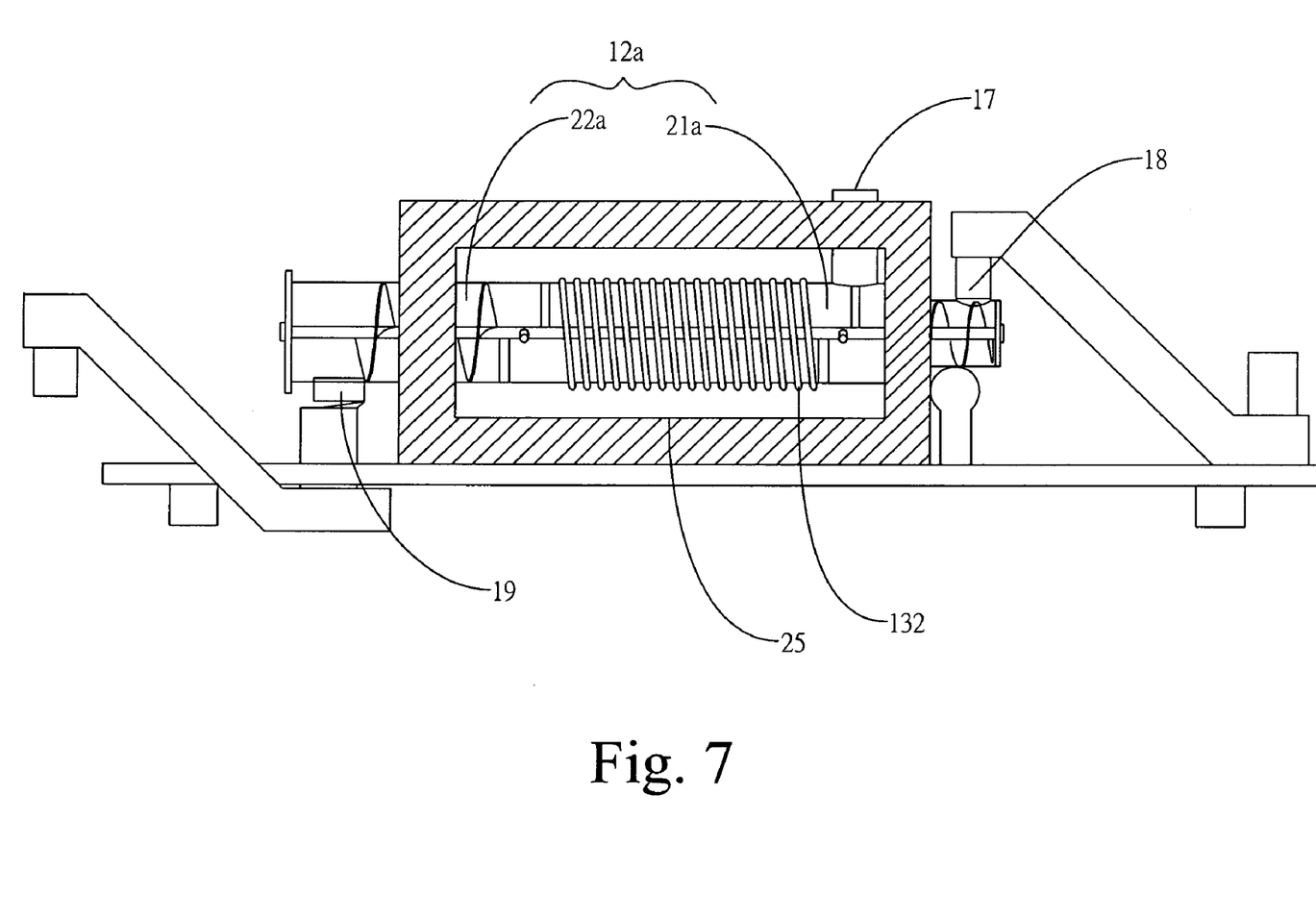
FIG. 7 is a sectioned side view of a reaction furnace utilizing high-temp steam and recirculated heat source to separate mercury and crack dioxin and organic substances contained in waste according to another embodiment of the present invention.

FIG. 7 is a sectioned side view of a reaction furnace utilizing high-temp steam and recirculated heat source to separate mercury and crack dioxin and organic substances contained in waste according to a second embodiment of the present invention. The second embodiment is generally structurally similar to the first preferred embodiment, except that the second combustion chamber 25 internally includes a thermal cracking reaction zone 21a and a high-temp activating zone 22a that are combined into one structure to enable a volume reduced reaction chamber 12a, so that the whole reaction furnace occupies only a reduced space.

The present invention is superior to the prior art in the following advantages and effects:

1. The particularly designed thermal cracking reaction zone and high-temp activating zone function to directly and effectively carbonize and activate the organic substance into activated carbon.
2. The reaction furnace of the present invention is a system that provides not only the function of a cracking furnace, but also the functions of dissociating dioxin and treating waste gas.
3. The reaction furnace of the present invention may be applied to physical treatment of carbon black, activated carbon, organic-containing materials, dioxin-containing substances, mercury-containing substances, plastic-containing substances, rubber-containing substances, coal, oil, kitchen residues, agricultural waste, and animal waste.
4. The thermal cracking reaction zone, the high-temp activating zone, and the high-temp steam heat exchanger are provided in the same one space and utilize the same heat source to heat; the produced steam is introduced into the reaction chamber to enable effective utilization of heat energy to achieve the purpose of energy saving. Moreover, since recirculated heat source and high-temp steam are fully utilized, an overall volume of the reaction furnace is reduced by more than 40% to largely reduce the manufacturing cost thereof.
5. The present invention is able to carbonize any organic substances or organic-containing substances into activated carbon having a BET (Brunauer Emmett and Teller Method) larger than 200.
6. The duration for the high-temp hot gas to flow from the high-temp activating zone to the discharge port is less than 1 second.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A reaction furnace utilizing high-temp steam and recirculated heat source to separate mercury and crack dioxin and organic substances contained in waste, comprising:

a first combustion chamber being provided with a burner to produce high-temp hot gas; and a second combustion chamber being provided with a gas inlet, a gas outlet, a reaction chamber, and a high-temperature steam generator; and the reaction chamber being provided with a feed inlet, a gas mixture outlet, and a discharge outlet; and waste to be treated being introduced into the reaction chamber via the feed inlet; the high-temp hot gas produced in the first combustion chamber being introduced into the second combustion chamber via the gas inlet to heat the reaction chamber and the high-temp steam generator of the second combustion chamber, and becoming cooled down before being discharged via the gas outlet; high-temp steam produced by the high-temp steam generator being introduced into the reaction chamber, so that mercury, organic substances, and dioxin in the waste are distilled and carried away by the steam; gas mixture produced during the reaction process being discharged via a gas mixture outlet to a gas mixture treatment system for separation; fuel gas and fuel oil separated from the gas mixture by the gas mixture treatment system being introduced into the burner of the first combustion chamber for producing the high-temp hot gas, and waste water separated from the gas mixture by the gas mixture treatment system being led to the high-temp steam generator for producing the high-temp steam; and soil contained in the waste having been treated in the reaction chamber being discharged via the discharge outlet.

2. The reaction furnace as claimed in claim 1, wherein the waste consists of soil and carbon-containing substances, and the carbon-containing substances include carbon black, activated carbon, organic-containing materials, dioxin-containing substances, mercury-containing substances, plastic-containing substances, rubber-containing substances, coal, oil, kitchen residues, agricultural waste, and animal waste.

3. The reaction furnace as claimed in claim 1, wherein the high-temp steam generator includes a high-temp steam heat exchanger and a heat exchanger, and the waste water separated from the gas mixture by the gas mixture treatment system is introduced into the heat exchanger for producing steam.

4. The reaction furnace as claimed in claim 3, wherein the heat exchanger is located in a heat exchange chamber, which is provided with a discharge port and communicates with the second combustion chamber via the gas outlet thereof, so that the hot gas having been cooled down in the second combustion chamber is sent to the heat exchange chamber via the gas outlet to heat the heat exchanger in the heat exchange chamber and becomes cooled down for a second time before being discharged via the discharge port.

5. The reaction furnace as claimed in claim 3, wherein the high-temp steam heat exchanger is provided with a steam inlet, via which the high-temp steam heat exchanger communicates with the heat exchanger; so that steam produced at the heat exchanger is led into the high-temp steam heat exchanger via the steam inlet and continuously heated to produce high-temp steam.

6. The reaction furnace as claimed in claim 1, wherein the reaction chamber includes a thermal cracking zone and a high-temp activating zone.

7. The reaction furnace as claimed in claim 1, wherein the gas mixture treatment system includes a cooler, an oil/water separator, and a mercury/water separator.

8. The reaction furnace as claimed in claim 3, wherein the gas mixture treatment system includes a cooler, an oil/water separator, and a mercury/water separator.

* * * * *